United States Patent
Yoder et al.

(10) Patent No.: US 10,924,664 B2
(45) Date of Patent: Feb. 16, 2021

(54) ENHANCED BATTERY EDGE DETECTION

(71) Applicant: Microsoft Technology Licensing, LLC, Redmond, WA (US)

(72) Inventors: Gregory Scott Yoder, Redmond, WA (US); Minsoo Kim, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/924,166

(22) Filed: Mar. 16, 2018

(65) Prior Publication Data
US 2019/0289200 A1    Sep. 19, 2019

(51) Int. Cl.
| | |
|---|---|
| *H04N 5/232* | (2006.01) |
| *H04N 5/225* | (2006.01) |
| *G06T 1/00* | (2006.01) |
| *G06K 9/62* | (2006.01) |
| *H04N 5/33* | (2006.01) |
| *G06K 9/58* | (2006.01) |

(52) U.S. Cl.
CPC .......... *H04N 5/23229* (2013.01); *G06K 9/58* (2013.01); *G06K 9/6288* (2013.01); *G06T 1/0014* (2013.01); *H04N 5/2256* (2013.01); *H04N 5/332* (2013.01); *G06T 2207/10048* (2013.01); *G06T 2207/30164* (2013.01)

(58) Field of Classification Search
CPC .... H04N 5/2256; H04N 5/2354; H04N 5/332; G06K 9/4661; G01N 21/8851; H05B 33/0854; A61L 2/10; G01J 3/2823; G01J 2003/2826
See application file for complete search history.

(56) References Cited

U.S. PATENT DOCUMENTS

| | | |
|---|---|---|
| 5,874,742 A | 2/1999 | Romano |
| 8,999,237 B2 | 4/2015 | Tumanov |
| 9,532,453 B2 | 12/2016 | Neudecker et al. |
| | (Continued) | |

FOREIGN PATENT DOCUMENTS

CN        205594143 U     9/2016

OTHER PUBLICATIONS

"Optical Quality Inspection within the Battery Production", Retrieved from: <<https://web.archive.org/web/20160322150901/https:/www.vitronic.com/industrial-and-logistics-automation/applications/inspection-and-quality-checking/battery-inspection.html>>, Mar. 22, 2016, 3 Pages.

*Primary Examiner* — Farhan Mahmud
(74) *Attorney, Agent, or Firm* — Rainier Patents, P.S.

(57) ABSTRACT

Enhanced battery edge detection devices, systems, and techniques are described herein. During an inspection process, an inspection system controls one or more non-visible light sources to illuminate a battery installed in an electronic device. The illumination activates a reflective pigment applied to at least a portion of an edge of the battery. The inspection system controls one or more cameras to capture at least one image of the illuminated battery installed in the electronic device. The at least one image is processed to detect the edge of the battery and to measure a gap size between the edge of the battery and a region of the electronic device proximate the edge of the battery. The electronic device and battery are flagged for further inspection if the measured gap size is below a threshold indicative of a zero gap event.

20 Claims, 7 Drawing Sheets

(56) References Cited

U.S. PATENT DOCUMENTS

| | | | |
|---|---|---|---|
| 10,355,319 B1* | 7/2019 | Lim | H01M 10/48 |
| 2004/0239291 A1* | 12/2004 | Watanabe | H01M 2/1066 |
| | | | 320/106 |
| 2011/0197951 A1 | 8/2011 | Abiko et al. | |
| 2011/0319137 A1* | 12/2011 | Takagi | H04B 1/3883 |
| | | | 455/566 |
| 2012/0052317 A1* | 3/2012 | Shi | C09B 67/0033 |
| | | | 428/522 |
| 2017/0161890 A1 | 6/2017 | Chu et al. | |
| 2017/0196108 A1 | 7/2017 | Inobe et al. | |

\* cited by examiner

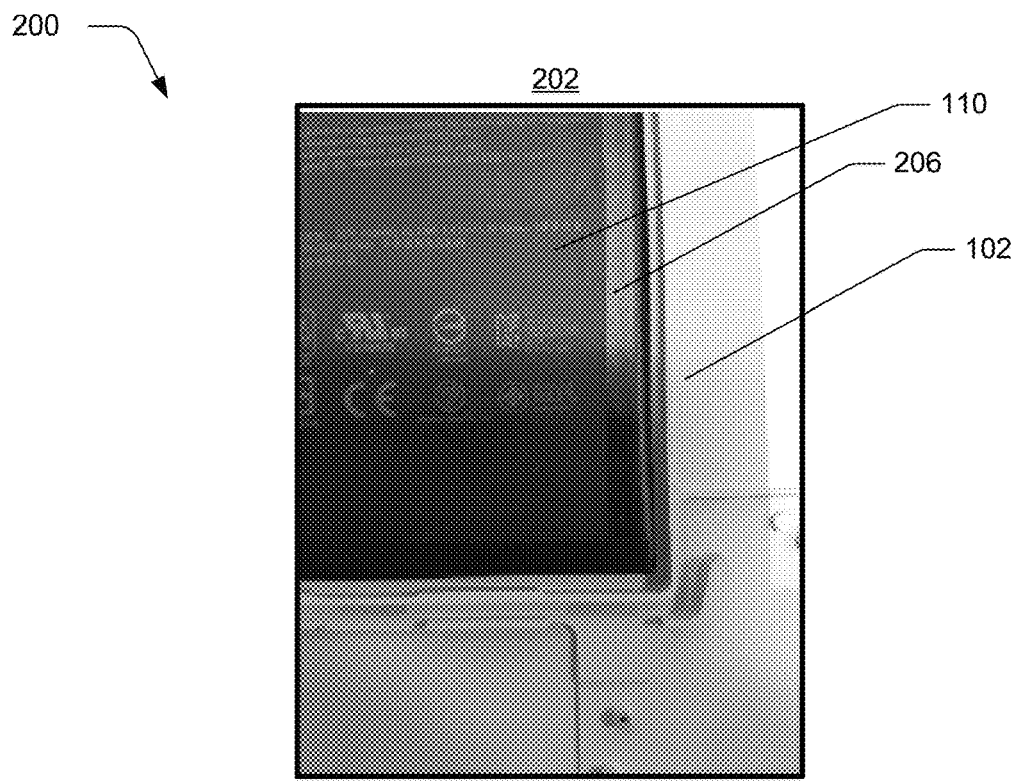
Image Captured with Non-Visible Light Illumination
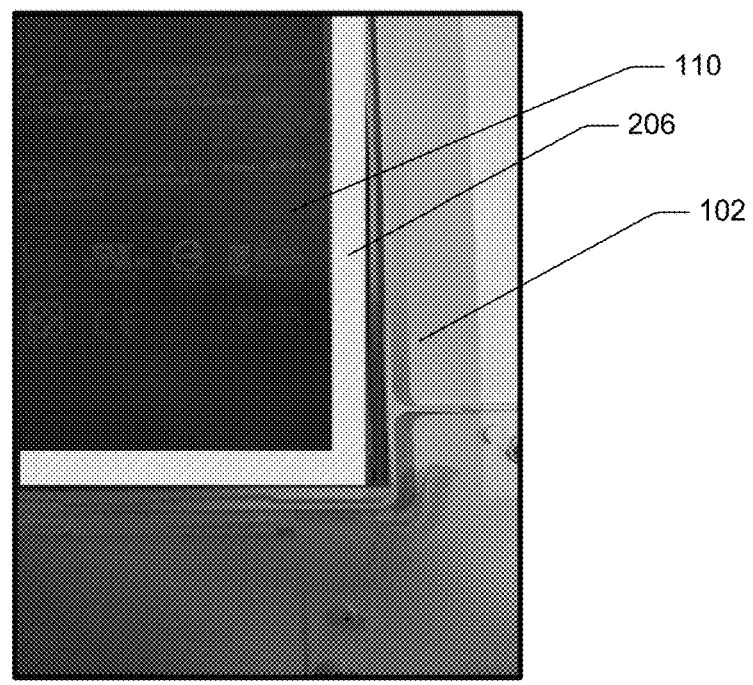
Fig. 2

ENHANCED BATTERY EDGE DETECTION

BACKGROUND

An automated optical inspection (AOI) system can be configured to inspect a battery installed in an electronic device to ensure that there is a gap between edges of the battery and the electronic device. When there is no gap (e.g., a gap size of zero), this is known as a "zero gap" condition. The battery to system zero gap condition is one of the most critical conditions to flag to ensure long term product reliability and customer safety. For example, in cases where there is no gap between the battery and the system, the surrounding housing or components may scrape or nick the battery which may increase the risk of an electrical short from the battery to the system.

The edge detection capability of conventional inspection systems, such as AOI systems, is limited due to a lack of discernable contrast between the battery and the device or system. In an attempt to increase battery edge contrast, conventional inspection systems often apply illumination by natural white light from different angles to try to enhance edge detection by creating a shadow relative to the desired detection edges. This conventional technique enables a target edge to be more pronounced and thus more easily detectable, but is limited in a small gap or zero gap condition. Another conventional technique stitches multiple image captures together with different lighting conditions. However, the machine readout from this conventional technique is often variable in small gap and zero gap conditions.

SUMMARY

Enhanced battery edge detection devices, systems, and techniques are described herein. An electronic device includes a housing and a battery installed in the housing of the electronic device. The battery includes a reflective pigment applied to at least a portion of an edge of the battery that is configured to be visible when exposed to non-visible illumination. During an inspection process, an inspection system controls one or more non-visible light sources to illuminate the battery installed in the electronic device. The illumination activates a reflective pigment applied to at least a portion of an edge of the battery. The inspection system controls one or more cameras to capture at least one image of the illuminated battery installed in the electronic device. The captured image is then processed by the inspection system to detect the edge of the battery and to measure a gap size between the edge of the battery and a region of the electronic device proximate the edge of the battery. The electronic device and battery are flagged for further inspection if the measured gap size is below a threshold indicative of a zero gap event.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 2 illustrates examples of a battery with insulation tape including a reflective pigment that is installed in an electronic device.

DETAILED DESCRIPTION

Figure 1:
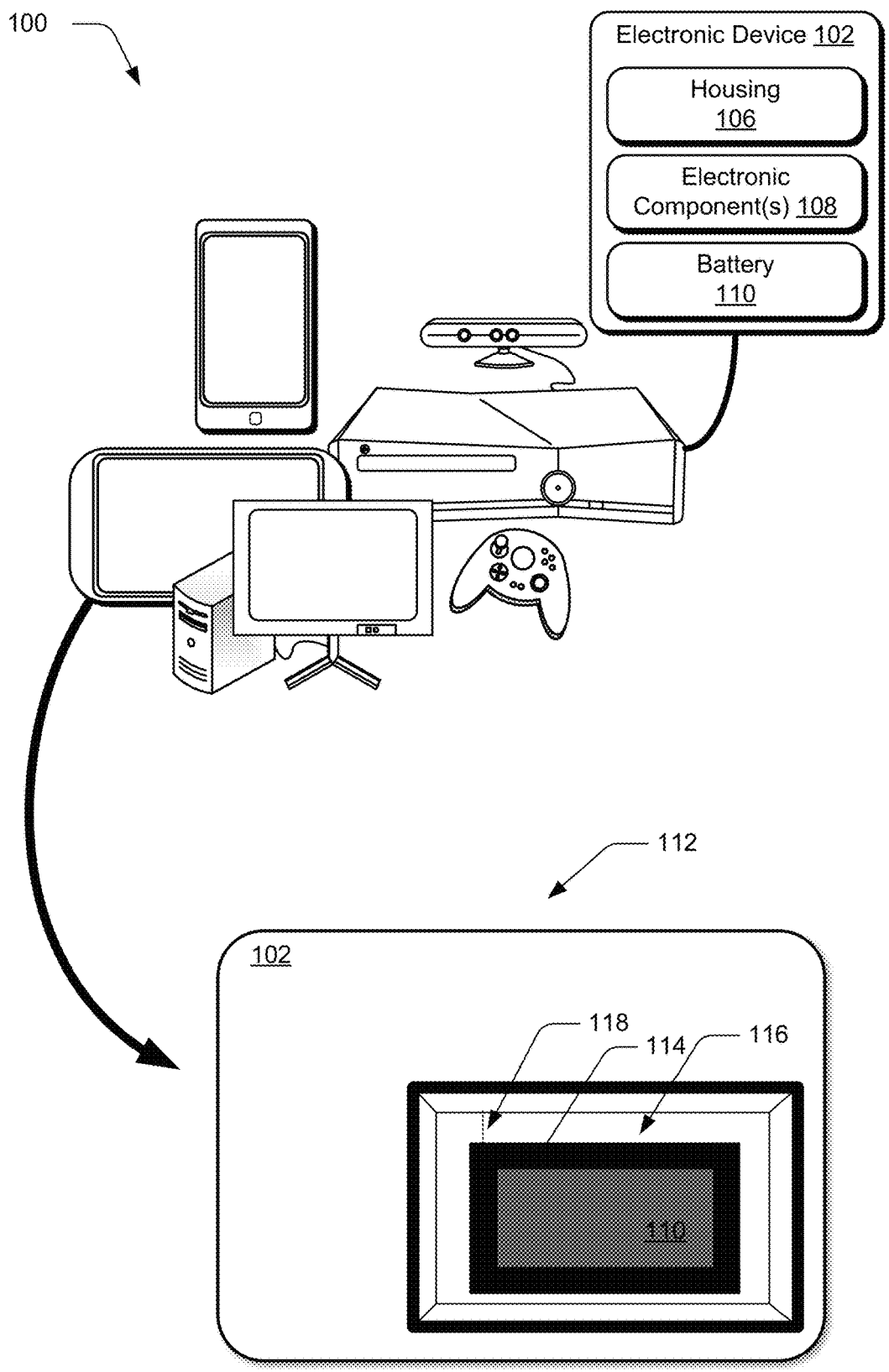
FIG. 1 is an illustration of an environment in an example implementation that is operable to employ the enhanced battery edge detection techniques described herein.

Enhanced battery edge detection devices, systems, and techniques are described herein. The described devices, systems, and techniques provide an improved process for battery edge detection and gap measurement as compared to conventional solutions. An inspection system, such as an automated optical inspection (AOI) system utilizes illumination in the non-visible wavelength (e.g., ultraviolet illumination or infrared illumination) to enhance contrast for battery edge detection and gap size measurement.

In order to improve battery edge detection for the inspection system, a reflective pigment (e.g., a fluorescent pigment) is applied to at least a portion of an edge of a battery to be installed in an electronic device. Alternately or additionally, the reflective pigment may be applied to one or more regions of the electronic device proximate the edge of the battery when installed. The reflective pigment is configured to be visible when exposed to non-visible illumination thereby enhancing battery edge detection and gap size measurement by the inspection system. Notably, the reflective pigment is invisible to the human eye when illuminated by natural light sources, and thus application of the reflective pigment does not change the visual appearance of the battery for industrial design purposes.

The reflective pigment can be generated and applied to the battery in a variety of different ways, including by spraying, painting, brushing, or printing the reflective pigment onto the battery. In one or more implementations, the reflective pigment is applied to a non-adhesive side of insulation tape for the battery. To do so, the reflective pigment can be mixed with a cosmetic coating layer of the non-adhesive side of the insulation tape. Alternatively, the pigment can be coated or printed on top of the cosmetic coating layer of the insulation tape in a secondary process. The insulation tape is then applied to the battery such that the reflective pigment is positioned on at least a portion of an edge of the battery. Notably, the insulation tape may be applied in targeted areas of the battery that require electrical insulation for functional and safety purposes, and thus does not add extra steps to the device manufacturing process. The battery is then installed in the electronic device, using an automated or manual process.

After installation of the battery in the device, the device is passed to the inspection system. Unlike conventional inspection systems, the inspection system described herein includes one or more non-visible light sources, such as one or more ultraviolet light sources or infrared light sources. The inspection system obtains an electronic device and installed battery, and controls the non-visible light source to illuminate the battery installed in the electronic device. Notably, illuminating the battery with the non-visible light allows for a design wavelength of the reflective pigment in the visible spectrum to be reflected. For example, ultraviolet illumination applied to a fluorescent pigment causes the fluorescent pigment to glow with a distinct color. The reflected wavelength effectively enhances the contrast between the edge of the battery and the electronic device.

While the battery is illuminated by the non-visible light source, the inspection system controls one or more cameras to capture at least one image of the illuminated battery installed in the electronic device. The inspection system processes the at least one image to detect the edge of the battery and measure a gap size between the edge of the battery and a region of the electronic device proximate the edge of the battery. The inspection system may utilize a contrast-based algorithm to detect the battery edge and the region of the electronic device based on the contrast between the edge of the battery and the region of the electronic device. If the measured gap size is below a threshold (e.g., a gap size of zero), the inspection system flags the electronic device and battery for further inspection or rework.

The combination of the reflective pigment applied to the edge of the battery and illumination by a non-visible light source enhances the contrast between the battery edge and the device thereby improving the reliability of edge detection and gap size measurement by the inspection system. This improved reliability enables better detection of zero gap events while also reducing the number of false positives. Building upon improved edge detectability performance, the higher confidence in detectability enables design gaps to be reduced which allows for a volumetric increase of active battery material. This increase in battery volume correlates to increased capacity and longer device run times.

FIG. 1 is an illustration of an environment 100 in an example implementation that is operable to employ the enhanced battery edge detection techniques described herein. Environment 100 includes examples of an electronic device 102, may be configured in a variety of ways. As illustrated in FIG. 1, an electronic device 102 may be configured as a tablet computing device, a laptop computing device, a desktop computer, a smartphone, or a gaming system. The electronic device 102 may also be implemented as a peripheral device, such as a speaker, a keyboard, and so forth. However, the electronic device 102 is not limited by these examples, and may correspond to any type of electronic device or product. Thus, the electronic device 102 may range from full resource devices with substantial memory and processor resources (e.g., personal computers, game consoles) to a low-resource device with limited memory and/or processing resources (e.g., mobile devices). An example device is described in more detail with regards to FIG. 7.

Electronic device 102 is illustrated as including a housing 106 and one or more electronic components 108. As described herein, the housing 106 of electronic device 102 corresponds to an enclosure, case, or chassis which encloses the one or more electronic components 108 of the electronic device 102. Notably, the housing 106 of electronic device 102 may be formed from a variety of different materials, and take on a variety of different form factors based on the type of device. For example, the form factor for the housing 106 of a tablet computing device is different than the form factor of the housing of a desktop computer, a smartphone, a head-mounted augmented reality (AR) or virtual reality (VR) device, and so forth.

Electronic components 108 may include a motherboard which is the main printed circuit board (PCB) found within electronic devices 102, and often includes many of the critical components essential to the functioning of the electronic device, such as the CPU, GPU, RAM, and so forth. However, as described herein, the electronic components 108 of electronic device 102 may correspond to any type of electronic component that is found within a housing of the device, such as PCBs and circuit boards other than the motherboard, displays, speakers, and so forth.

The electronic device 102 is further illustrated as including a battery 110 which is configured to provide power for electronic device 102. Battery 110 may be representative of a single battery or multiple batteries. Each battery 110 is representative of various different kinds of battery cells that may be included with the computing device including Super or Ultra Capacitor's, fuel cells, NiMH, NiCd, Pb & Lithium Chemistry battery packs. The battery 110 may include multiple batteries of the same type as well as include batteries having different characteristics such as different sizes/capacities, cycle counts, chemistries, battery technologies, shapes, state of charge (SOC), charge rates, discharge rates, impedance, and so forth. Accordingly, each battery 110 may include a diverse combination of multiple battery cells at least some of which may have different characteristics one to another.

At 112, battery 110 is shown as being installed within the housing electronic device 102. For example, the housing 106 of the electronic device 102 may include a cavity configured to receive the battery 110. In one or more implementations, the battery 110 is secured to the housing of the electronic device, such as via one or more screws and/or an adhesive. Alternately, in some cases, the battery 110 may be removably installed such that a user can remove the battery without the use of tools (e.g., a screwdriver).

In accordance with various implementations, battery 110 includes a reflective pigment 114 that is applied to at least a portion of an edge 116 of the battery 110. The reflective pigment 114, for example, may be applied to the edge 116 of the battery 110 prior to installation of the battery 110 into the electronic device 102. In this example, the battery is rectangular in shape, and the reflective pigment 114 is applied along all four edges 116 of the battery 110. However, the reflective pigment could also be applied to different targeted areas of different shaped batteries. In some cases, the reflective pigment can be applied to just a subset of the edges of the battery (e.g., two edges) or portions of the edges of the battery. For example, the reflective pigment could be applied to a corner of the battery that encompasses two perpendicular edges 116.

As discussed in more detail with regards to FIG. 4, below, the reflective pigment 114 is configured to enable detection of one or more edges of the battery 110 by an inspection system when the one or more targeted areas are illuminated by a non-visible light source, such as an ultraviolet or infrared light source. The detection of the battery edge 116 enables a reliable measurement of a gap 118 between the edge 116 and a region of the electronic device 102 proximate the edge 116. For example, as shown in FIG. 1, a small gap 118 exists between the edges 116 of the battery 110 and the housing of the electronic device 102.

In one or more implementations, the reflective pigment 114 is generated and applied to the one or more edges 116 of the battery 110 prior to installation of the battery 110 in the electronic device 102. Generally, the reflective pigment 114 is a reflective pigment that is not visible to the human eye in natural light conditions. However, when activated by a non-visible light source, the reflective pigment glows and is visible when captured by a camera. For example, the reflective pigment may be a fluorescent pigment that glows when activated by an ultraviolet light source. In another implementation, the reflective pigment may be configured to glow or be visible when illuminated by an infrared light source. In both cases, the reflective pigment is not visible to the human eye in natural light conditions and thus does not change the industrial design of the battery 110.

The reflective pigment 114 can be generated and applied to the battery in a variety of different ways, including by spraying, painting, brushing, or printing the reflective pigment onto the battery 110. In one or more implementations, the reflective pigment 114 is applied to a non-adhesive side of insulation tape for the battery 110. To do so, the reflective pigment can be mixed with a cosmetic coating layer of the non-adhesive side of the insulation tape. Alternatively, the pigment can be coated or printed on top of the cosmetic coating layer of the insulation tape in a secondary process. The insulation tape is then applied to the battery such that the reflective pigment is positioned on at least a portion of an edge of the battery 110. Notably, the insulation tape may be applied in targeted areas of the battery that require electrical insulation for functional and safety purposes, and thus does not add extra steps to the device manufacturing process. The battery is then installed in the electronic device, using an automated or manual process.

As an example, consider FIG. 2 which illustrates examples 200 of a battery with insulation tape including a reflective pigment that is installed in an electronic device. Example 200 illustrates an image of a battery 110 installed in an electronic device 102 that is captured with natural light illumination at 202, and an image of the same battery 110 installed in the same electronic device 102 captured with non-visible light illumination at 204. At both 202 and 204, the battery 110 includes insulation tape 206 around the edges of the battery 110. Notably, the insulation tape 206 is formed with a reflective pigment, such as a fluorescent pigment. However, under natural light conditions at 202, the reflective pigment is not visible and thus the insulation tape appears to be the same color (black) as the battery 110. However, at 204, under non-visible light illumination (e.g., ultraviolet light illumination) the reflective pigment in the insulation tape 206 changes in color. As discussed in more detail below with regards to FIG. 4, this change in color increase the contrast between the battery and the electronic device 102 which enhances the battery edge detection by the inspection system.

Figure 3:
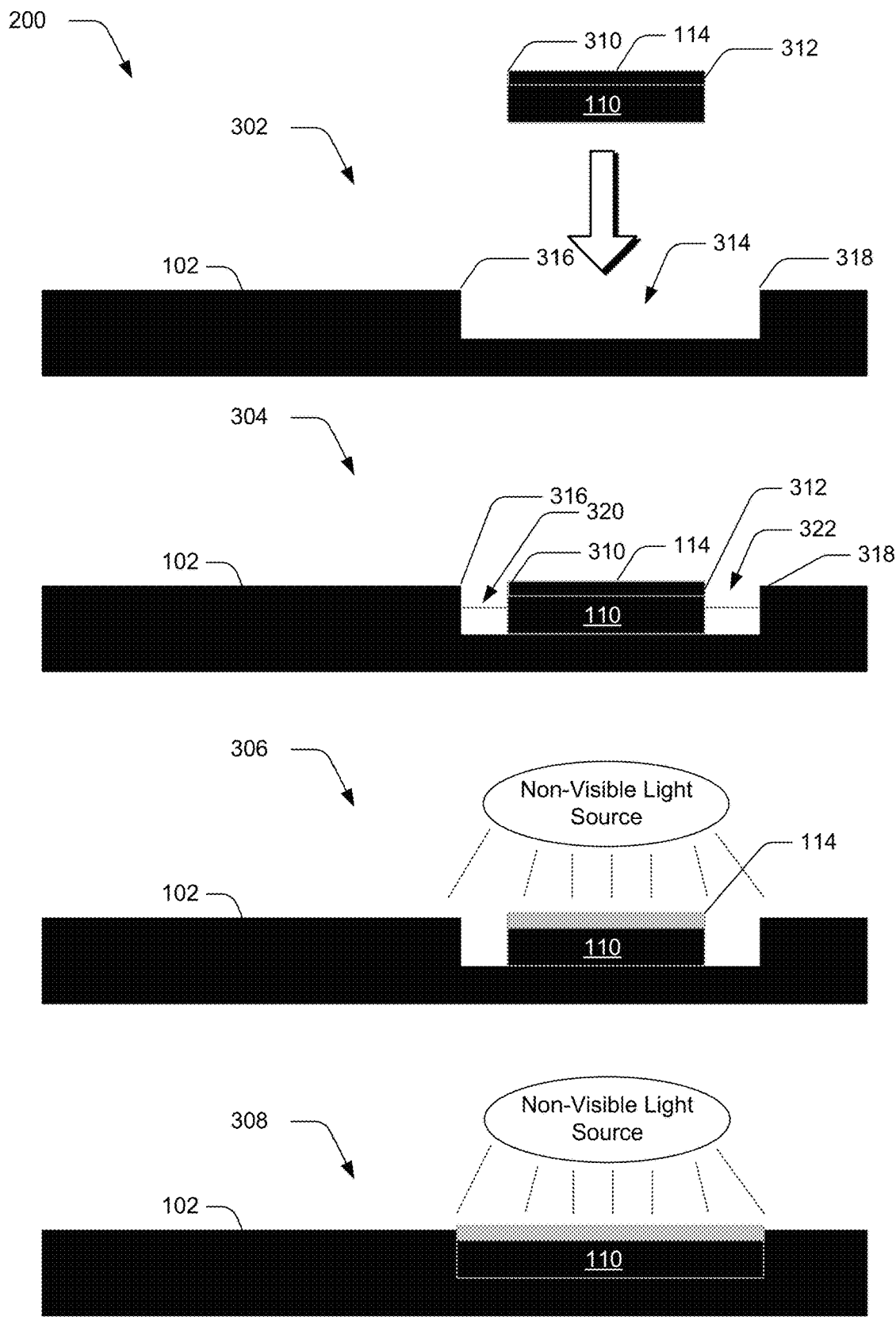
FIG. 3 illustrates an example of a cross section views of a battery with a reflective pigment for an electronic device.

FIG. 3 illustrates an example 300 of a cross section views of a battery with a reflective pigment for an electronic device. Example 300 illustrates four examples at 302, 304, 306, and 308. At 302, battery 110 is shown prior to installation into electronic device 102 with reflective pigment 114, and as including a first battery edge 310 and a second battery edge 312. Electronic device 102 is depicted as including a cavity 314 that is configured to receive the battery 110, and a first device edge 316 and second device edge 318. Notably, under natural light conditions, the reflective pigment 114 is the same general color of the battery 110.

At 304, the battery 110 is installed into the cavity 314 of electronic device 102. In this example, a first gap 320 exists between first battery edge 310 and first device edge 316, and a second gap 322 exists between second battery edge 312 and second device edge 318.

At 306 and 308, the battery 110 is illuminated by a non-visible light source, which changes the color of the reflective pigment 114. Notably, example 308 illustrates a zero gap event in which there is no gap between the first battery edge 310 and first device edge 316, or between the second battery edge 312 and second device edge 216. Since the battery 110 and the device are a similar color, this zero gap event can be difficult to detect by conventional inspection systems. However, because the reflective pigment changes color when activated by the non-visible light source, the contrast between the edges of the battery and the device are detectable by the inspection system described herein.

Figure 4:
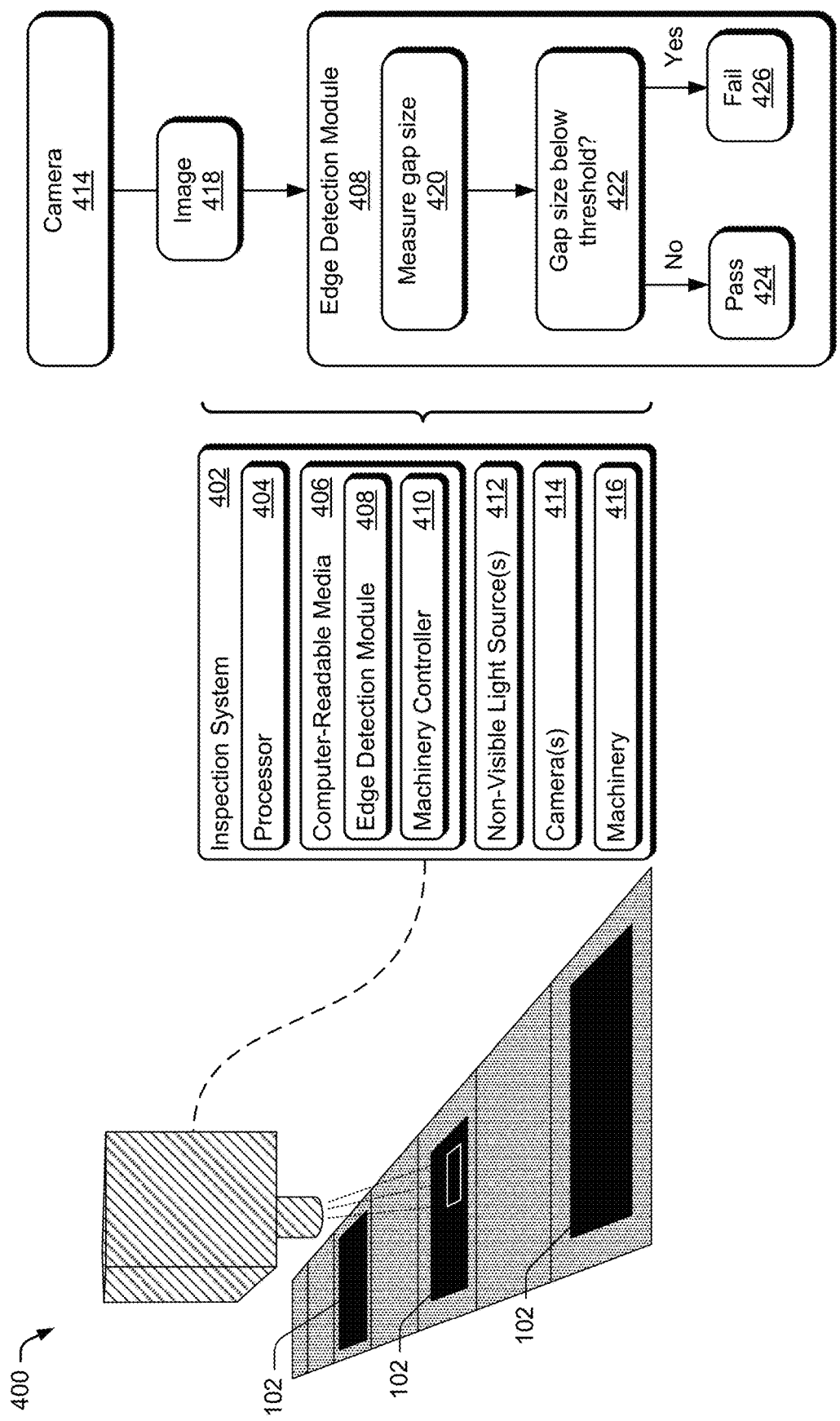
FIG. 4 illustrates an example environment in which enhanced battery edge detection techniques may be implemented.

FIG. 4 illustrates an example environment 400 in which enhanced battery edge detection techniques may be implemented. Environment 400 includes an inspection system 402 which may be implemented as any type of inspection system, such as an AOI inspection system, machine vision system, and so forth.

Inspection system 402 includes a processor 404, which may be configured as a single or multi-core processor capable of enabling various functionalities of the inspection system 402. Processor 404 may be coupled with, and may implement functionalities of, any other components or modules of inspection system 402 that are described herein.

Inspection system 402 also includes computer-readable media 406. Computer-readable media 406 may include device data, such as an operating system, firmware, or applications of inspection system 402 that are executable by processor 404. Computer-readable media 406 is illustrated as including an edge detection module 408 and a machinery controller 410. Inspection system 402 is further illustrated as including one or more non-visible lights sources 412 and one or more cameras 414. As described throughout, non-visible light sources 412 may include an ultraviolet light source, an infrared light source, and so forth.

Machinery controller 410 controls machinery 416 to position an electronic device 102 with an installed battery 110 at an image capture position below the non-visible light sources 412 and the one or more cameras 414. Edge detection module 408 controls non-visible light source 412 to illuminate the electronic device 102 and installed battery 110. In some cases, the non-visible light source 412 is controlled to illuminate the entire electronic device 102, while in other cases the non-visible light source 412 can be controlled to selectively illuminate a portion of the electronic device 102 corresponding to one or more edges of the battery 110. The illumination from the non-visible light source 412 activates a reflective pigment applied to at least a portion of an edge of the battery 110.

While the battery 110 is illuminated, the edge detection module 408 controls camera 414 to capture at least one image 418 of the illuminated battery 110 installed in the electronic device 102. In some cases, the camera 414 is controlled to capture one or more targeted areas corresponding to one or more edges of the battery 110.

Edge detection module 408 receives the at least one image 418 of the illuminated battery 110 installed in the electronic device 102. At 420, the edge detection module 408 processes the at least one image to detect the edge of the battery and measure a gap size between the edge of the battery 110 and a region of the electronic device 102 proximate the edge of the battery 110. In some cases, the edge detection module 408 utilizes a contrast-based algorithm to detect the battery edge and the region of the electronic device based on the contrast between the edge of the battery and the region of the electronic device. As discussed throughout, the contrast is increased by the non-visible light source activating the reflective pigment. For example, the edge detection module 408 can detect two different contrast regions, one contrast region corresponding to the reflective pigment on the edges of the battery 110 and the other contrast region corresponding to the electronic device 102. The edge detection module 408 then measures the gap size by calculating the distance between the two contrast regions.

At 422, the edge detection module 408 compares the gap size to a threshold. The threshold is customizable based on the device type and battery. Generally, the threshold is selected to prevent zero gap events, and may take into account a variety of different factors, such as battery variation, device variation, battery position, and so forth. If the gap size is greater than the threshold, then a pass result 424 is generated by the edge detection module signifying that a zero gap event has not been detected and the electronic device moves forward through the assembly and inspection process. Alternately, if the gap size is below the threshold, then a fail result 426 is generated by the edge detection module 408. In some cases, the fail result 426 is generated if the gap size is zero (e.g., a zero gap event). In this case, electronic device and battery are flagged for further inspection and/or rework to correct the gap size error.

Figure 5:
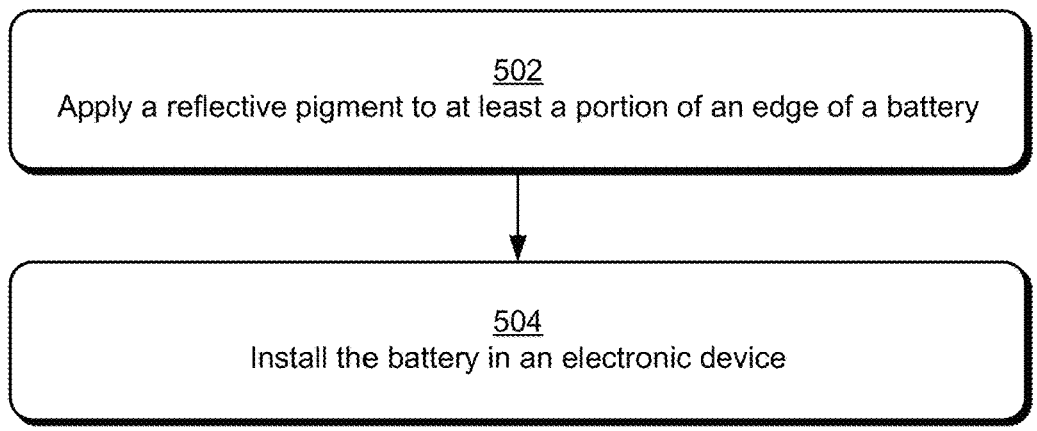
FIG. 5 depicts an example procedure of applying a reflective pigment to at least a portion of an edge of a battery.

FIG. 5 depicts an example procedure 500 of applying a reflective pigment to at least a portion of an edge of a battery. Aspects of this procedure may be implemented in hardware, firmware, or software, or a combination thereof. The procedures are shown as a set of blocks that specify operations performed by one or more devices and are not necessarily limited to the orders shown for performing the operations by the respective blocks.

A reflective pigment is applied to at least a portion of an edge of a battery (block 502). For example, a reflective pigment 114 is applied to at least a portion of an edge 116 of a battery 110. The reflective pigment 114 is configured to enable detection of one or more edges of the battery 110 by an inspection system when the one or more targeted areas are illuminated by a non-visible light source, such as an ultraviolet or infrared light source. The detection of the battery edge 116 enables a reliable measurement of a gap 118 between the edge 116 and a region of the electronic device 102 proximate the edge 116.

In one or more implementations, the reflective pigment 114 is generated and applied to the one or more edges 116 of the battery 110 prior to installation of the battery 110 in the electronic device 102. Generally, the reflective pigment 114 is a reflective pigment that is not visible to the human eye in natural light conditions. However, when activated by a non-visible light source, the reflective pigment glows and is visible when captured by a camera. For example, the reflective pigment may be a fluorescent pigment that glows when activated by an ultraviolet light source. In another implementation, the reflective pigment may be configured to glow or be visible when illuminated by an infrared light source. In both cases, the reflective pigment is not visible to the human eye in natural light conditions and thus does not change the industrial design of the battery 110.

The reflective pigment 114 can be generated and applied to the battery in a variety of different ways, including by spraying, painting, brushing, or printing the reflective pigment onto the battery 110. In one or more implementations, the reflective pigment 114 is applied to a non-adhesive side of insulation tape for the battery 110. To do so, the reflective pigment can be mixed with a cosmetic coating layer of the non-adhesive side of the insulation tape. Alternatively, the pigment can be coated or printed on top of the cosmetic coating layer of the insulation tape in a secondary process. The insulation tape is then applied to the battery such that the reflective pigment is positioned on at least a portion of an edge of the battery 110. Notably, the insulation tape may be applied in targeted areas of the battery that require electrical insulation for functional and safety purposes, and thus does not add extra steps to the device manufacturing process.

The battery is installed in an electronic device (block 504). For example, after applying the reflective pigment 114 to at least a portion of an edge 116 of the battery 110, the battery 110 is installed into electronic device 102. The application of the reflective pigment to the battery and installation of the battery in the device may be part of a manual and/or automated process.

Figure 6:
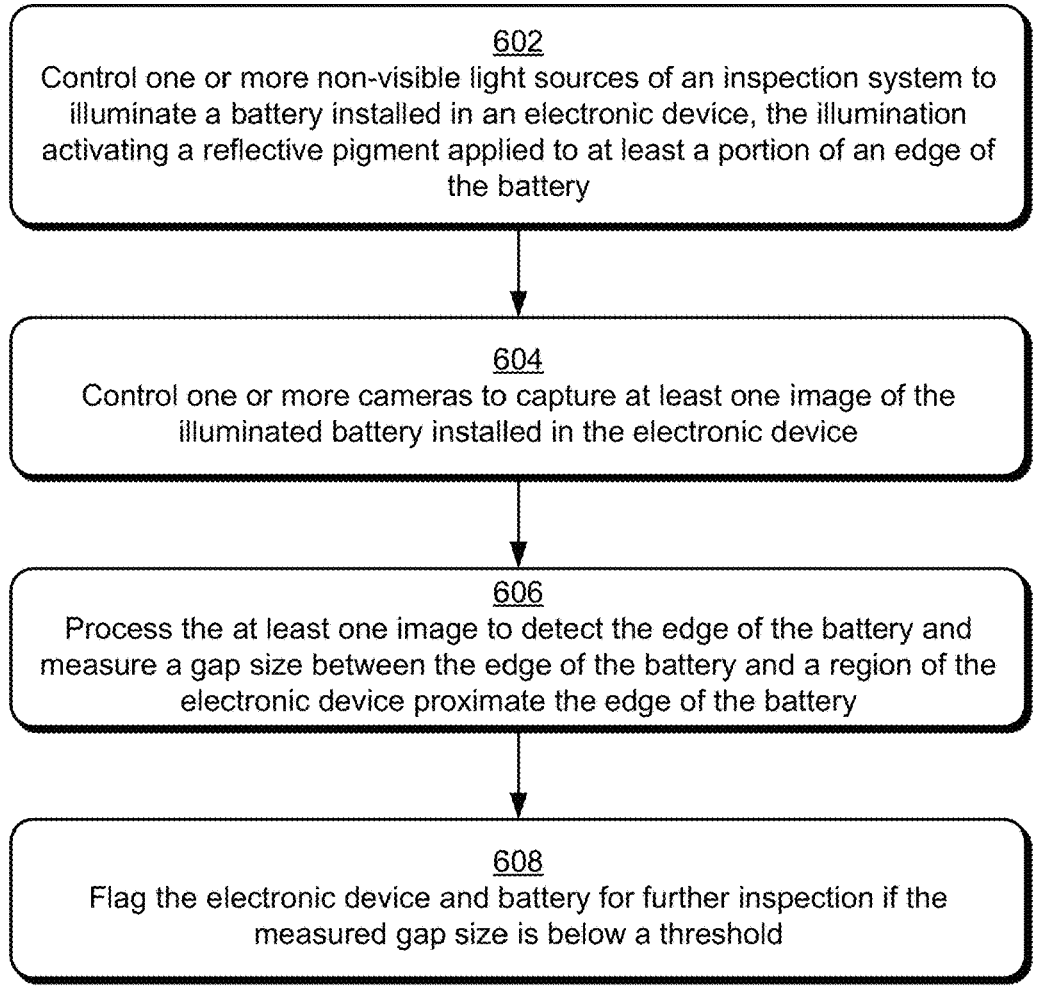
FIG. 6 depicts an example procedure of enhanced battery edge detection.

FIG. 6 depicts an example procedure 600 of enhanced battery edge detection. Aspects of this procedure may be implemented in hardware, firmware, or software, or a combination thereof. The procedures are shown as a set of blocks that specify operations performed by one or more devices and are not necessarily limited to the orders shown for performing the operations by the respective blocks.

One or more non-visible light sources of an inspection system are controlled to illuminate a battery installed in an electronic device, where the illumination activates a reflective pigment applied to at least a portion of an edge of the battery (block 602). By way of example, machinery controller 410 controls machinery 416 to position an electronic device 102 with an installed battery 110 at an image capture position below the non-visible light sources 412 and the one or more cameras 414. Then, edge detection module 408 controls non-visible light source 412 to illuminate the electronic device 102 and installed battery 110. In some cases, the non-visible light source 412 is controlled to illuminates the entire electronic device 102, while in other cases the non-visible light source 412 can be controlled to selectively illuminate a portion of the electronic device 102 corresponding to one or more edges of the battery 110. The illumination from the non-visible light source 412 activates a reflective pigment applied to at least a portion of an edge of the battery 110.

One or more cameras are controlled to capture at least one image of the illuminated battery installed in the electronic device (block 604). For example, while the battery 110 is illuminated, the edge detection module 408 controls camera 414 to capture at least one image 418 of the illuminated battery 110 installed in the electronic device 102. In some cases, the camera 414 is controlled to capture one or more targeted areas corresponding to one or more edges of the battery 110.

The at least one image is processed to detect the edge of the battery and measure a gap size between the edge of the battery and a region of the electronic device proximate the edge of the battery (block 606). For example, edge detection module 408 receives the at least one image 418 of the illuminated battery 110 installed in the electronic device 102. The edge detection module 408 processes the at least one image to detect the edge of the battery and measure a gap size between the edge of the battery 110 and a region of the electronic device 102 proximate the edge of the battery 110. In some cases, the edge detection module 408 utilizes a contrast-based algorithm to detect the battery edge and the region of the electronic device based on the contrast between the edge of the battery and the region of the electronic device. As discussed throughout, the contrast is increased by the non-visible light source activating the reflective pigment. For example, the edge detection module 408 can detect two different contrast regions, one contrast region corresponding to the reflective pigment on the edges of the battery 110 and the other contrast region corresponding to the electronic device 102. The edge detection module 408 then measures the gap size by calculating the distance between the two contrast regions.

The electronic device and battery are flagged for further inspection if the measured gap size is below a threshold (block 608). For example, the edge detection module 408 compares the gap size to a threshold. The threshold is customizable based on the device type and battery. Generally, the threshold is selected to prevent zero gap events, and may take into account a variety of different factors, such as battery variation, device variation, battery position, and so forth. If the gap size is greater than the threshold, then a pass result is generated by the edge detection module signifying that a zero gap event has not been detected and the electronic device moves forward through the assembly and inspection process. Alternately, if the gap size is less than the threshold, then a fail result is generated by the edge detection module 408 signifying that a zero gap event has been generated. In this case, electronic device and battery are flagged for further inspection and/or rework to correct the gap size error.

Figure 7:
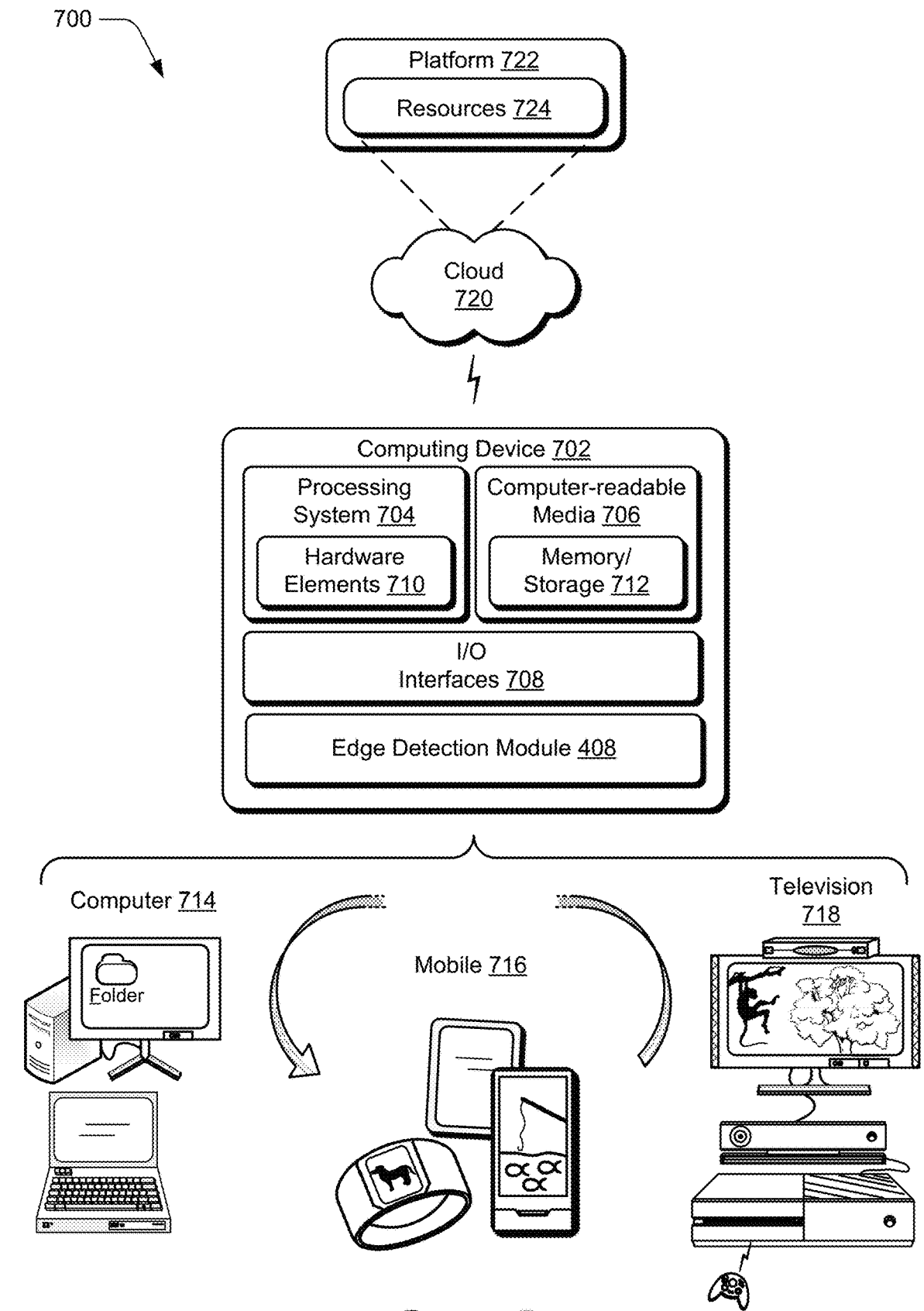
FIG. 7 illustrates an example system that includes an example computing device that is representative of one or more computing systems and/or devices that may implement the various techniques described herein.

FIG. 7 illustrates an example system generally at 700 that includes an example computing device 702 that is representative of one or more computing systems and/or devices that may implement the various techniques described herein. The example computing device 702, for example, may be implemented as the electronic device 102 with an installed battery 110 as discussed throughout. The example computing device 702 may also be implemented as a computing device of the inspection system 402. This is illustrated through inclusion of the edge detection module 408. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some examples to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one implementation, the central computing device may be a cloud of one or more server computers that are connected to the multiple devices through a network, the Internet, or other data communication link.

In an implementation, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In another implementation, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, wearables (e.g., wrist bands, pendants, rings, etc.) portable music player, portable gaming device, a tablet computer, a multi-screen computer, and so on. The computing device 702 may also be implemented as the television 718 class of device that includes devices having or connected to generally larger screens in casual viewing environments. These devices include televisions, set-top boxes, gaming consoles, and so on. Other devices are also contemplated, such as appliances, thermostats and so on as part of the "Internet of Things."

The techniques described herein may be supported by these various configurations of the computing device 702 and are not limited to the specific examples of the techniques described herein. This functionality may also be implemented all or in part through use of a distributed system, such as over a "cloud" 720 via a platform 722 as described below.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device, implementation of functionality described herein may be distributed throughout the system 700. For example, the functionality may be implemented in part on the computing device 702 as well as via the platform 722 that abstracts the functionality of the cloud 720.

Example implementations described herein include, but are not limited to, one or any combinations of one or more of the following examples:

In one or more examples, an inspection system comprises: one or more cameras; one or more non-visible light sources; and at least a memory and a processor to implement an edge detection module, the edge detection module configured to perform operations comprising: controlling the one or more non-visible light sources to illuminate a battery installed in an electronic device, the illumination activating a reflective pigment applied to at least a portion of an edge of the battery; controlling the one or more cameras to capture at least one image of the illuminated battery installed in the electronic device; processing the at least one image to detect the edge of the battery and measure a gap size between the edge of the battery and a region of the electronic device proximate the edge of the battery; and flagging the electronic device and battery for further inspection if the measured gap size is below a threshold.

An example as described alone or in combination with any of the other examples described above or below, wherein the controlling the non-visible light source to illuminate the battery activates a reflective wavelength of the reflective pigment.

An example as described alone or in combination with any of the other examples described above or below, wherein the reflective wavelength enhances a contrast between the edge of the battery and the region of the electronic device proximate the edge of the battery in the captured at least one image.

An example as described alone or in combination with any of the other examples described above or below, wherein the processing the at least one image to measure the gap size further comprises utilizing a contrast-based algorithm to detect the edge of the battery and the region of the electronic device based on the contrast between the edge of the battery and the region of the electronic device.

An example as described alone or in combination with any of the other examples described above or below, wherein the flagging occurs if the measured gap size between the edge of the battery and the region of the device is zero.

An example as described alone or in combination with any of the other examples described above or below, wherein the edge detection module is further configured to generate a pass result if the measured gap size is above the threshold.

An example as described alone or in combination with any of the other examples described above or below, wherein the one or more non-visible light sources comprise one or more ultraviolet light sources.

An example as described alone or in combination with any of the other examples described above or below, wherein the one or more non-visible light sources comprise one or more infrared light sources.

An example as described alone or in combination with any of the other examples described above or below, wherein the inspection system comprises an automated optical inspection (AOI) system.

In one or more examples, an electronic device comprises: a housing; and a battery installed in the housing of the electronic device, the battery comprising a reflective pigment applied to at least a portion of an edge of the battery, the reflective pigment configured to be visible when exposed to non-visible illumination.

An example as described alone or in combination with any of the other examples described above or below, wherein the reflective pigment is applied to a non-adhesive side of insulation tape applied to at least the portion of the edge of the battery.

An example as described alone or in combination with any of the other examples described above or below, wherein the reflective pigment is mixed with an existing cosmetic coating layer on the non-adhesive side of the insulation tape.

An example as described alone or in combination with any of the other examples described above or below, wherein the reflective pigment is coated or printed on top of the cosmetic coating layer on the non-adhesive side of the insulation tape.

An example as described alone or in combination with any of the other examples described above or below, wherein the reflective pigment is applied to at least the portion of the edge of the battery by painting, spraying, brushing, or printing the reflective pigment onto the portion of the edge of the battery.

An example as described alone or in combination with any of the other examples described above or below, wherein the reflective pigment is also applied to at least one corresponding region of the electronic device proximate the portion of the edge of the battery.

An example as described alone or in combination with any of the other examples described above or below, wherein the reflective pigment is applied to at least a first portion of a first edge of the battery and a second portion of a second edge of the battery.

An example as described alone or in combination with any of the other examples described above or below, wherein the reflective pigment is invisible to the human eye when illuminated by natural light sources.

An example as described alone or in combination with any of the other examples described above or below, wherein the reflective pigment comprises a fluorescent pigment that is visible when exposed to ultraviolet illumination An example as described alone or in combination with any of the other examples described above or below, wherein the fluorescent pigment glows with a distinct color when exposed to the ultraviolet illumination thereby increasing contrast between the edge of the battery and a corresponding region of the electronic device proximate the edge of the battery, the contrast usable by an inspection system to measure a gap size between the edge of the battery and the corresponding region of the electronic device proximate the edge of the battery.

In one or more examples, a computer-implemented method implemented by an inspection system comprises: controlling one or more non-visible light sources to illuminate a battery installed in an electronic device, the illumination activating a reflective pigment applied to at least a portion of an edge of the battery; controlling the one or more cameras to capture at least one image of the illuminated battery installed in the electronic device; processing the at least one image to detect the edge of the battery and measure a gap size between the edge of the battery and a region of the electronic device proximate the edge of the battery; and flagging the electronic device and battery for further inspection if the measured gap size is below a threshold.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. An electronic device comprising:
a housing; and
a battery installed in the housing of the electronic device, the battery comprising a fluorescent pigment that contacts at least two edges of the battery,
the fluorescent pigment configured to glow with a distinct color when exposed to non-visible illumination,
wherein at least two corresponding regions of the electronic device proximate to the at least two edges of the battery have a different color than the distinct color of the fluorescent pigment, thereby increasing contrast between the at least two edges of the battery and the at least two corresponding regions of the electronic device,
the increased contrast usable by an inspection system having a non-visible light source to measure a gap size between the at least two edges of the battery and the at least two corresponding regions of the electronic device.

2. The electronic device of claim 1, wherein the fluorescent pigment is applied to a non-adhesive side of insulation tape applied to the at least two edges of the battery.

3. The electronic device of claim 2, wherein the fluorescent pigment is mixed with an existing cosmetic coating layer on the non-adhesive side of the insulation tape.

4. The electronic device of claim 2, wherein the fluorescent pigment is coated or printed on top of a cosmetic coating layer on the non-adhesive side of the insulation tape.

5. The electronic device of claim 1, wherein the fluorescent pigment is applied by painting, spraying, brushing, or printing the fluorescent pigment onto the at least two edges of the battery.

6. The electronic device of claim 1, wherein the at least two edges of the battery are perpendicular.

7. The electronic device of claim 1, wherein the fluorescent pigment is applied to less than all of a first edge of the battery and less than all of a second edge of the battery.

8. The electronic device of claim 1, wherein the fluorescent pigment is invisible to the human eye when illuminated by natural light sources.

9. The electronic device of claim 1, wherein the at least two edges contacted by the fluorescent pigment are perpendicular edges that form a corner of the battery and the fluorescent pigment contacts an entirety of the perpendicular edges, including the corner.

10. The electronic device of claim 9, wherein the fluorescent pigment glows with the distinct color when exposed to ultraviolet illumination.

11. The electronic device of claim 1, wherein the fluorescent pigment contacts at least four edges of the battery.

12. The electronic device of claim 1, wherein the battery forms a rectangle and the fluorescent pigment forms a perimeter around the rectangle.

13. The electronic device of claim 1, wherein the fluorescent pigment is applied to a first surface of the battery, extends along the first surface to an edge of a second surface of the battery, and extends along the first surface to another edge of a third surface of the battery.

14. The electronic device of claim 13, wherein the first surface is a top of the battery and the second surface and the third surface are different sides of the battery that meet at a corner of the battery.

15. The electronic device of claim 1, wherein the fluorescent pigment contacts at least two non-adjacent edges of the battery.

16. The electronic device of claim 1, wherein the fluorescent pigment forms a perimeter along at least one surface of the battery.

17. The electronic device of claim 1, wherein the fluorescent pigment forms a continuous perimeter along at least one surface of the battery.

18. The electronic device of claim 1, wherein the fluorescent pigment contacts at least three surfaces of the battery.

19. The electronic device of claim 1, wherein the fluorescent pigment contacts at least three edges of the battery.

20. The electronic device of claim 19, wherein the fluorescent pigment contacts a first surface of the battery and the at least three edges are adjacent to at least three other surfaces of the battery.

* * * * *